United States Patent

Candor et al.

[11] 3,755,911
[45] Sept. 4, 1973

[54] LIQUID REMOVING APPARATUS AND METHOD

[76] Inventors: Robert R. Candor, 5940 Munger Rd., Miami Township, Ohio 45459; James T. Candor, 5440 Cynthia Ln., Washington Township, Ohio 45429

[22] Filed: Oct. 28, 1970

[21] Appl. No.: 84,598

Related U.S. Application Data

[63] Continuation-in-part of Ser. No. 842,807, July 7, 1969, Pat. No. 3,517,234, which is a continuation-in-part of Ser. No. 696,639, Jan. 9, 1968, which is a continuation-in-part of Ser. No. 639,354, May 18, 1967, Pat. No. 3,405,452, which is a continuation-in-part of Ser. No. 532,266, March 7, 1966, Pat. No. 3,330,136, which is a continuation-in-part of Ser. No. 219,587, Aug. 27, 1962, Pat. No. 3,238,750, said Ser. No. 842,807, is a continuation-in-part of Ser. Nos. 748,298, July 29, 1968, Pat. No. 3,491,456, and Ser. No. 769,155, Oct. 21, 1968, Pat. No. 3,543,408, and Ser. No. 807,539, March 17, 1969, Pat. No. 3,633,282.

[52] U.S. Cl. .................................................. 34/1
[51] Int. Cl. ............................................. F26b 3/34
[58] Field of Search ............................................ 34/1

[56] References Cited
UNITED STATES PATENTS

| | | | |
|---|---|---|---|
| 3,096,161 | 7/1963 | Morrison et al. | 34/1 |
| 3,403,450 | 10/1968 | Mann et al. | 34/1 |
| 3,491,456 | 1/1970 | Candor et al. | 34/1 |
| 3,491,457 | 1/1970 | Schreiber et al. | 34/1 |
| 3,546,783 | 12/1970 | Candor et al. | 34/1 |
| 3,633,282 | 1/1972 | Candor et al. | 34/1 |
| 3,543,408 | 12/1970 | Candor et al. | 34/1 |

*Primary Examiner*—Carroll B. Dority, Jr.
*Attorney*—Candor, Candor & Tassone

[57] ABSTRACT

This disclosure relates to a laundry apparatus, paper making apparatus or the like wherein the moisture or liquid in the wet laundry, food materials, paper slurry or the like, disposed therein is removed by an electrostatic means that provides a differential in the potential of the moisture in the laundry, food materials, paper slurry or the like and an electrode means for the moisture to tend to cause the moisture to leave the laundry, food materials, paper slurry or the like and move toward the electrode means.

14 Claims, 3 Drawing Figures

Patented Sept. 4, 1973

3,755,911

INVENTORS
ROBERT R. CANDOR
JAMES T. CANDOR

BY

*Candor, Candor & Tassone*

THEIR ATTORNEYS

LIQUID REMOVING APPARATUS AND METHOD

This application is a continuation-in-part of copending application, Ser. No. 842,807, now U.S. Pat. No. 3,517,234 and filed July 7, 1969, which, in turn, is a continuation-in-part of copending application, Ser. No. 696,639, filed Jan. 9, 1968, which, in turn, is a continuation-in-part of its copending patent application, Ser. No. 639,354, filed May 18, 1967, now U.S. Pat. No. 3,405,452, which, in turn, is a continuation-in-part of its copending patent application, Ser. No. 532,266, filed Mar. 7, 1966, now U.S. Pat. No. 3,330,136, which, in turn, is a continuation-in-part of its copending patent application, Ser. No. 219,587, filed Aug. 27, 1962, now U.S. Pat. No. 3,238,750. Aforementioned application Ser. No. 842,807 is also a continuation-in-part of copending application, Ser. No. 748,298, filed July 29, 1968, now U.S. Pat. No. 3,491,456, Ser. No. 769,155, now patent No. 3,543,408 filed Oct. 21, 1968, and Ser. No. 807,539, now U.S. Pat. No. 3,633,282 filed Mar. 17, 1969.

This invention relates to an improved machine and method, and/or to a moisture or liquid bearing material treating machine or method.

It has been proven by many published experiments that a body of water or other similar liquids can be held in a vertical non-porous vessel having a fine capillary discharge tube at the bottom and with the capillary tube preventing discharge of the liquid from the vessel, when the liquid is not electrically charged. When a high potential electric charge is imparted to the liquid in the vessel, droplets, a steady thread stream, or a fine cloud of fine droplets of the liquid are discharged from such capillary tube, depending on the electric potential imparted to the liquid in the vessel. Additionally, if a grounded plate is placed in spaced perpendicular relation to the discharge end of the capillary tube, the potential applied to the body of liquid in the vessel need not be as high to produce similar results.

Features of this invention are disclosed in this specification, in the appended claimed subject matter and/or the accompanying drawings, in which:

Figure 3:
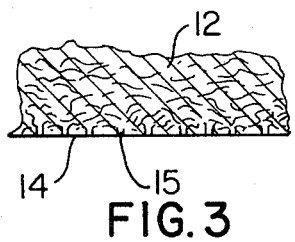
FIG. 3 is an enlarged view schematically showing the capillary tubes.

According to this invention a body of water or similar liquids may be held in a body 10 and/or 12 of a porous or absorbent material, which material has an outer surface formed at 14 with a plurality or a continuous formation of capillary tubes 15, schematically illustrated in FIG. 3. Such body can have an electric potential imparted thereto by electrode 16 or 18 and a similar discharge of droplets, a steady thread stream or a fine cloud of fine droplets from such capillary tubes will be discharged therefrom.

The body of porous or absorbent material 12 may be paper, paper forming slurry, cloth, and the like.

Similarly, a grounded electrode, or oppositely charged electrode 20 or 22 may be placed adjacent, or below, the discharge surface of the paper, slurry, cloth, etc.

Additionally, a moving supporting plate, screen, felt band, or the like, 24 or 26 may be provided to receive and/or remove the discharged liquid, as well as to support the material 12. The grounded electrode or oppositely charged electrode 20 or 22 may be placed on, connected to, or be spaced below such supporting plate, screen, felt band, etc.

If desired, the charging electrode 18 for the body of porous or absorbent material may be spaced from such body 12, and a dome or nozzle 28 with an open end 29 may receive such electrode. Air or other gas different from air may be discharged at 30 into said nozzle or dome 28, and such air or gas in said dome 28 may be charged or ionized by the electrode 18 and will impart the charge to such body of liquid in said body of porous or absorbent material 12 to cause the liquid to be discharged through said capillary tubes 15 in the surface 14. The grounded or oppositely charged electrode 22 may be placed on the other side of the body 12 or its supporting structure 26.

The air in the dome 28 is ionized adjacent the material 12 so that such ions will be adapted to attach to at least some of the retained moisture in material 12 to be then discharged from such material 12 into the felt band 26 or the like.

The supporting plate, screen, felt band, or the like, 24 or 26 may be supported or guided by one or more rolls 32 which may cause the plate, screen, felt band, or the like 24, 26 to have part or all of the liquid discharged or removed therefrom, as more specifically disclosed in one or more of the parent applications.

The potentials herein described may be produced by any well known DC source of electrical energy 34, which source may be a single mechanism or a plurality of such mechanisms. Also, one of the potentials may be a ground connection, if desired.

The moisture bearing material 10 and/or 12 may include a funnel 36 which contains a body 10 of paper forming slurry or the like, and which discharges the same in the form of a flat body 12 of slurry which may be supported on the moving supporting plate, screen, felt band, or the like 24 or 26. The liquid removed therefrom, according to this invention, may be received, absorbed or removed therefrom by a porous felt band 24, 26, if desired, in the manner more fully disclosed in one or more of the parent applications.

The body of slurry 10 may be intermittently supplied with additional bodies of slurry in a manner so that the body 10 is not grounded but may keep substantially the potential imparted to the flat body 12.

Figure 1:
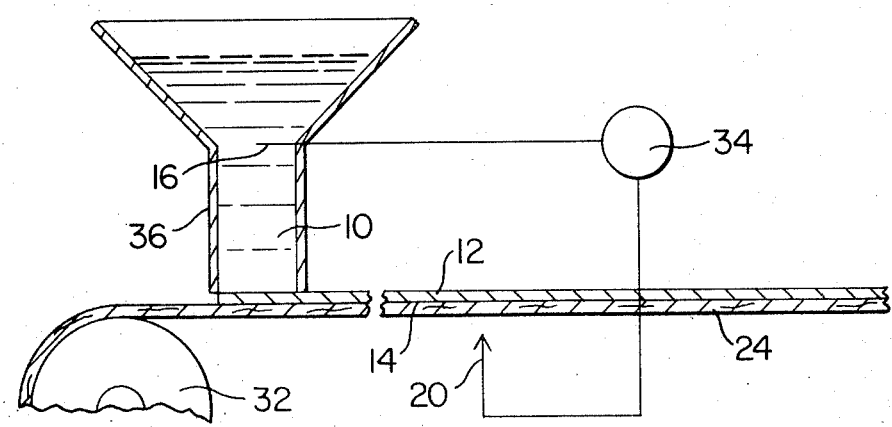
FIG. 1 is a schematic representation of one embodiment of this invention.
Figure 2:
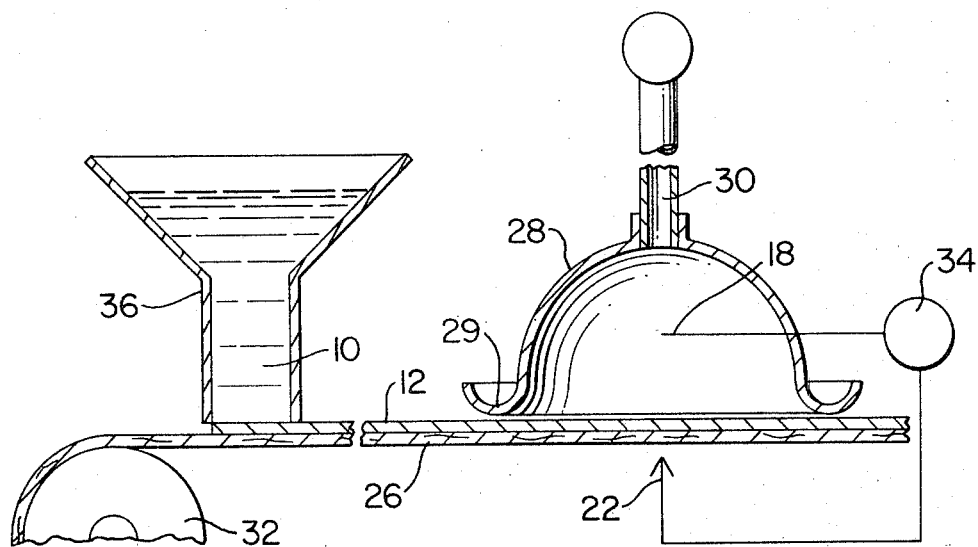
FIG. 2 is a view similar to FIG. 1 showing another embodiment of this invention.

Thus, the electrode means 16 of FIG. 1 tends to charge the retained moisture by direct electrical contact therewith whereas the electrode means 18 of FIG. 2 tends to charge the retained moisture by charged ions, the electrode means 16 and 18 respectively being utilized with or without the electrode means 20 and 22.

It may be found that the embodiments of FIGS. 1 and 2 should be utilized in combination along a sheet to be dried with one or more apparatus, of FIGS. 1 or 2, being at the wetter end of the sheet with one or more apparatus of FIGS. 2 or 1 being at the drier end of the sheet. Obviously, other such combinations of FIGS. 1 and 2 could be utilized.

It is thus to be seen that this invention has provided an apparatus and/or method for removing retained moisture from a moisture bearing material 12 of the moisture absorbing type, supporting means 24 for supporting the moisture bearing material, electrode means 16 disposed adjacent the supporting means and in electrical contact with the moisture bearing material, and means 34 or the like for creating a substantially constant electrostatic field action with the electrode means 16 and with or without the electrode means 20 that causes at least some of the retained moisture to leave the material 12 in substantially liquid form solely by the electrostatic field action being imposed thereon.

It is also to be seen that this invention has provided an apparatus and/or method for removing retained moisture from a moisture bearing material 12 of the moisture absorbing type, supporting means 26 for supporting the moisture bearing material, electrode means 18 disposed adjacent the supported material 12 and being adapted to ionize the atmosphere adjacent the material so that such ions will be adapted to attach to at least some of the retained moisture, and means 34 or the like creating a substantially constant electrostatic field action that will cause at least some of the created ions to attach to at least some of the retained moisture of the moisture bearing material 12 to cause the same to leave the material 12 solely by the substantially constant electrostatic field action imposed thereon.

The nozzle means 28 may have an open end 29 adjacent the material 12 so that the ionized air attaches to the material 12 before the air leaves the open end 29.

The gas 30 may be a gas different from the gas or air outside the nozzle means 28.

Thus, it can be seen that new and useful apparatus and methods have thus been provided by this invention.

While the forms of the invention now preferred have been disclosed as required by the statutes, other forms may be used, all coming within the scope of the claims which follow.

What is claimed is:

1. In an apparatus for removing retained moisture from moisture bearing material of the moisture absorbing type, supporting means for supporting said moisture bearing material, electrode means disposed adjacent said supported material and being adapted to ionize the atmosphere adjacent said material so that such ions will be adapted to attach to at least some of said retained moisture, and means creating a substantially constant electrostatic field action that will cause at least some of said ions to attach to at least some of the retained moisture of said moisture bearing material to cause the same to leave said material solely by the substantially constant electrostatic field action imposed thereon.

2. In an apparatus as set forth in claim 1, a nozzle means receiving said electrode means and having an open end thereof disposed adjacent said material.

3. In an apparatus as set forth in claim 2, means for providing an atmosphere in said nozzle means that is ionized by said electrode means.

4. In an apparatus as set forth in claim 3, said means for providing said atmosphere creating an atmosphere about said electrode means with a fluid different than the fluid outside said nozzle means.

5. In an apparatus as set forth in claim 1, said means for creating said substantially constant electrostatic field action comprising another electrode means disposed adjacent said material whereby said electrostatic field action causes said ionized moisture to tend to leave said material and move toward said other electrode means.

6. In an apparatus as set forth in claim 5, said other electrode means being grounded.

7. In an apparatus as set forth in claim 5, said other electrode means having a polarity opposite to the polarity of said ionized moisture.

8. In a method for removing retained moisture from moisture bearing material of the moisture absorbing type, the method steps of supporting said moisture bearing material, disposing an electrode means adjacent said supported material, ionizing the atmosphere adjacent said material so that said ions will be adapted to attach to at least some of said retained moisture, and creating a substantially constant electrostatic field action that will cause at least some of said ions to attach to at least some of said retained moisture to cause the same to leave said material solely by the substantially constant electrostatic field action imposed on such ions.

9. In a method as set forth in claim 8, said step of creating said electrostatic field action comprising the steps of disposing another electrode means adjacent said supported material, and grounding said other electrode.

10. In a method as set forth in claim 8, said step of creating said electrostatic field action comprising the steps of disposing another electrode means adjacent said supported material, and charging said other electrode with a polarity opposite to the polarity of said ions.

11. In an apparatus for removing retained moisture from moisture bearing material of the moisture absorbing type, supporting means for supporting said moisture bearing material, means disposed adjacent said supported material and out of electrical contact therewith while being adapted to create a charge on at least some of said retained moisture, and means creating a substantially constant electrostatic field action that will cause at least some of the charged retained moisture of said moisture bearing material to leave said material solely by the substantially constant electrostatic field action imposed thereon.

12. In an apparatus as set forth in claim 11, said means for creating said substantially constant electrostatic field action comprising electrode means disposed adjacent said material whereby said electrostatic field action causes said charged moisture to tend to leave said material and move toward said electrode means.

13. In a method for removing retained moisture from moisture bearing material of the moisture absorbing type, the method steps of supporting said moisture bearing material, disposing means adjacent said supported material but out of electrical contact therewith, creating a charge on at least some of said retained moisture with said means while said means is out of electrical contact with said retained moisture, and creating a substantially constant electrostatic field action that will cause at least some of said charged retained moisture to leave said material solely by the substantially constant electrostatic field action imposed thereon.

14. In a method as set forth in claim 13, said step of creating said electrostatic field action comprising the steps of disposing electrode means adjacent said supported material whereby said electrostatic field action causes said charged moisture to tend to leave said material and move toward said electrode means.

* * * * *

Dedication

3,755,911.—*Robert R. Candor;* Miami Township and *James T. Candor,* Washington Township, Ohio. LIQUID REMOVING APPARATUS AND METHOD. Patent dated Sept. 4, 1973. Dedication filed Oct. 17, 1980, by the inventors.

Hereby dedicates to the Public the entire term of said patent.

[*Official Gazette December 23, 1980*]